United States Patent
Cohn et al.

(10) Patent No.: US 9,206,761 B2
(45) Date of Patent: Dec. 8, 2015

(54) OPEN-VALVE PORT FUEL INJECTION OF ALCOHOL IN MULTIPLE INJECTOR ENGINES

(71) Applicant: Ethanol Boosting Systems, LLC, Cambridge, MA (US)

(72) Inventors: Daniel R. Cohn, Cambridge, MA (US); Leslie Bromberg, Sharon, MA (US)

(73) Assignee: Ethanol Boosting Systems, LLC, Cambridge, MA (US)

( * ) Notice: Subject to any disclaimer, the term of this patent is extended or adjusted under 35 U.S.C. 154(b) by 0 days.

(21) Appl. No.: 14/599,904

(22) Filed: Jan. 19, 2015

(65) Prior Publication Data
US 2015/0128901 A1 May 14, 2015

Related U.S. Application Data

(63) Continuation of application No. 13/609,733, filed on Sep. 11, 2012, now abandoned.

(60) Provisional application No. 61/535,404, filed on Sep. 16, 2011, provisional application No. 61/603,977, filed on Feb. 28, 2012, provisional application No. 61/663,670, filed on Jun. 25, 2012, provisional application No. 61/667,493, filed on Jul. 3, 2012.

(51) Int. Cl.
*F02D 41/30* (2006.01)
*F02D 41/00* (2006.01)
(Continued)

(52) U.S. Cl.
CPC .......... *F02D 41/3094* (2013.01); *F02D 19/061* (2013.01); *F02D 19/0655* (2013.01);
(Continued)

(58) Field of Classification Search
CPC F02M 25/07; F02D 41/0025; F02D 41/0047; F02D 41/3094; F02D 19/0694
USPC ........ 123/436, 568.12, 27 GE, 299, 300, 431, 123/575, 577, 198 A; 701/103, 104, 108, 701/110, 111
See application file for complete search history.

(56) References Cited

U.S. PATENT DOCUMENTS

| | | |
|---|---|---|
| 3,106,194 A | 10/1963 | Cantwell, Jr. et al. |
| 4,402,296 A | 9/1983 | Schwarz |

(Continued)

FOREIGN PATENT DOCUMENTS

JP  2009-197740  * 9/2009 .............. F02D 13/02

OTHER PUBLICATIONS

Society of Automotive Engineers, Inc., SAE Technical Paper Series, No. 700887, Feb. 1970, pp. 1-6, "Engine Cooling by Direct Injection of Cooling Water", 7 pages, Modak, et al.

(Continued)

*Primary Examiner* — Hai Huynh
(74) *Attorney, Agent, or Firm* — Nields, Lemack & Frame, LLC

(57) ABSTRACT

An engine having two or more fuel injectors is disclosed, where at least one of the injectors is used to port fuel inject fuel into the cylinder when the air intake valve is open. The open valve port fuel injector is used to inject a fuel that has alcohol as a constituent and is the same fuel injected by another fuel injector. In other embodiments, the open valve fuel injector is used to inject an anti-knock fuel containing alcohol while a primary fuel, is introduced by another injector. The operation of the open valve fuel injector can be optimized to maximize the vaporization cooling. In other embodiments, the open valve fuel injector may be used in conjunction with direct injection of the primary fuel or the anti-knock fuel. Heavy EGR can be optimally used with the various embodiments.

26 Claims, 4 Drawing Sheets

(51) Int. Cl.
*F02D 19/06* (2006.01)
*F02D 19/08* (2006.01)
*F02M 35/108* (2006.01)

(52) U.S. Cl.
CPC ........ *F02D19/0689* (2013.01); *F02D 19/0692* (2013.01); *F02D 19/0694* (2013.01); *F02D 19/081* (2013.01); *F02D 41/005* (2013.01); *F02D 19/0665* (2013.01); *F02M 35/1085* (2013.01); *Y02T 10/36* (2013.01); *Y02T 10/47* (2013.01)

(56) References Cited

U.S. PATENT DOCUMENTS

| | | | |
|---|---|---|---|
| 4,480,616 | A | 11/1984 | Takeda |
| 4,541,383 | A | 9/1985 | Jessel |
| 4,721,081 | A | 1/1988 | Krauja et al. |
| 4,958,598 | A | 9/1990 | Fosseen |
| 5,937,799 | A | 8/1999 | Binion |
| 6,076,487 | A | 6/2000 | Wulff et al. |
| 6,287,351 | B1 | 9/2001 | Wulff et al. |
| 6,298,838 | B1 | 10/2001 | Huff et al. |
| 6,332,448 | B1 | 12/2001 | Ilyama et al. |
| 6,508,233 | B1 | 1/2003 | Suhre et al. |
| 6,513,505 | B2 | 2/2003 | Watanabe et al. |
| 6,543,423 | B2 | 4/2003 | Dobryden et al. |
| 6,575,147 | B2 | 6/2003 | Wulff et al. |
| 6,668,804 | B2 | 12/2003 | Dobryden et al. |
| 6,799,551 | B2 | 10/2004 | Nakakita et al. |
| 6,892,691 | B1 | 5/2005 | Uhl et al. |
| 6,990,956 | B2 | 1/2006 | Niimi |
| 7,021,277 | B2 | 4/2006 | Kuo et al. |
| 7,178,326 | B2 * | 2/2007 | Kojima et al. ................ 60/278 |
| 7,225,787 | B2 | 6/2007 | Bromberg et al. |
| 7,314,033 | B2 | 1/2008 | Cohn et al. |
| 7,647,916 | B2 | 1/2010 | Leone et al. |
| 7,890,241 | B2 * | 2/2011 | Russell ......................... 701/103 |
| 8,165,780 | B2 * | 4/2012 | Russell ......................... 701/103 |
| 8,302,580 | B2 | 11/2012 | Cohn et al. |
| 8,522,746 | B2 | 9/2013 | Cohn et al. |
| 2002/0014226 | A1 | 2/2002 | Wulff et al. |
| 2009/0292442 | A1 | 11/2009 | Leone et al. |
| 2010/0121559 | A1 | 5/2010 | Bromberg et al. |
| 2011/0168128 | A1 | 7/2011 | Bradley et al. |
| 2011/0186011 | A1 | 8/2011 | Kubo et al. |
| 2013/0073183 | A1 * | 3/2013 | Cohn et al. .................... 701/104 |
| 2013/0218438 | A1 * | 8/2013 | Surnilla et al. ................ 701/102 |
| 2014/0060493 | A1 * | 3/2014 | Iwai et al. ..................... 123/478 |

OTHER PUBLICATIONS

Society of Automotive Engineers, Inc., SAE Technical Paper Series, No. 880495, Feb.-Mar. 1988, pp. 1-20, "Direct Injection Ignition Assisted Alcohol Engine", 21 pages, Lorusso, et al.

Society of Automotive Engineers, Inc., SAE Technical Paper Series, No. 982476, Oct. 1998, pp. 1-9, "Knock Suppression in a Turbocharged SI Engine by Using Cooled EGR", 11 pages, Grandin, et al.

Society of Automotive Engineers, Inc., SAE Technical Paper Series, No. 1999-01-3505, Oct. 1999, 9 pages, "Replacing Fuel Enrichment in a Turbo Charged SI Engine: Lean Burn or Cooled EGR", Grandin, et al.

Society of Automotive Engineers, Inc., SAE Technical Paper Series, No. 2001-01-1207, Mar. 2001, 12 pages, "Internal Mixture Formation and Combustion—from Gasoline to Ethanol", Stan, et al.

International Search Report and Written Opinion mailed Nov. 23, 2012 in corresponding PCT application No. PCT/US2012/054720.

Office Action mailed Oct. 15, 2014 in corresponding parent U.S. Appl. No. 13/609,733.

* cited by examiner

# OPEN-VALVE PORT FUEL INJECTION OF ALCOHOL IN MULTIPLE INJECTOR ENGINES

This application is a Continuation of U.S. patent application Ser. No. 13/609,733 filed Sep. 11, 2012, which claims priority of U.S. Provisional Patent Application Ser. Nos. 61/535,404, filed Sep. 16, 2011; 61/603,977 filed on Feb. 28, 2012; 61/663,670, filed Jun. 25, 2012; and 61/667,493 filed Jul. 3, 2012, the disclosures of which are incorporated herein by reference in their entireties.

BACKGROUND OF THE INVENTION

The performance and efficiency of spark ignition engines can be increased by increasing knock resistance. Direct injection of alcohol in spark ignition gasoline engines provides strong vaporization cooling of the fuel-air mixture in the cylinders and thereby substantially increases knock resistance. The increased knock resistance allows operation and higher compression ratio and/or higher levels of turbocharging.

The alcohol can be either directly injected from a single source by itself or along with gasoline or another fuel, or injected on-demand from a secondary tank into an engine that is primarily fueled with gasoline. For example, U.S. Pat. No. 7,225,787 and U.S. Pat. No. 7,314,033 describe gasoline engines in which on-demand use of ethanol or methanol from a secondary tank is employed to prevent knock at high torque.

Direct injection, however, has the disadvantage that if it is to be employed by modifying existing engines that are not direct injection spark ignition engines, it is necessary to change the engine head in order to provide the additional penetration for the direct injector. This can substantially increase the effort that is required for engine modification. An example is the conversion of a turbo diesel engine to a spark ignition engine that uses direct injection.

On-demand use of alcohol from port fuel injection can be employed as an alternative to direct injection and is described in U.S. Pat. No. 7,314,033. However, as discussed in this patent, it has the disadvantage that, while there is a knock resistance improvement from the higher chemical octane of the alcohol relative to gasoline, the vaporization cooling effect inside the cylinder is lost in conventional port fuel injection. In conventional port fuel injection, the air intake valve is closed when the fuel is injected in the manifold and the vaporization cooling takes place outside of the cylinder.

Use of open-valve port fuel injection of the alcohol bearing fuel can provide a way to maintain the advantage of ease of implementation of port fuel injection while also providing some vaporization cooling of the injected alcohol bearing fuel. In this case, some of the liquid fuel from the port fuel injector enters through the cylinder intake port and provides vaporization cooling of the fuel-air mixture.

Employment of two port fuel injectors, where the injectors inject different fuels and one of the injectors provides alcohol while the cylinder intake valve is open has been described in U.S. Pat. No. 7,647,916. However, it does not discuss a set of approaches that could be particularly effective in increasing the knock resistance of open-valve port fuel injection and minimizing the adverse effects of open valve port fuel injection. U.S. Pat. No. 7,647,916 also did not discuss other uses of open-valve port fuel injection to enhance the operating characteristics of spark ignition engines.

Therefore, improved means to maximize knock resistance and minimize the adverse effects of open-valve port fuel injection are needed. The use of open-valve port fuel injection to improve the capability of spark engines using direct injection and using different fuels would also be beneficial

SUMMARY OF THE INVENTION

An engine having two of more fuel injectors is disclosed, where at least one of the fuel injectors is used to port fuel inject fuel into the cylinder when the air intake valve is open. This provides vaporization cooling, thereby increasing the stability of the gaseous mixture and reducing autoignition. In some embodiments, the open valve fuel injector is used to inject the primary fuel, which is typically gasoline. In other embodiments, the open valve fuel injector is used for separately controlled injection of an anti-knock fuel that contains alcohol. The position and operation of the open valve fuel injector can also be modified to optimize the vaporization cooling provided by the fuel injected through this injector. In other embodiments, the open valve fuel injector may be used in connection with direct injection of either the primary fuel or the anti-knock fuel.

DETAILED DESCRIPTION OF THE INVENTION

Figure 1:
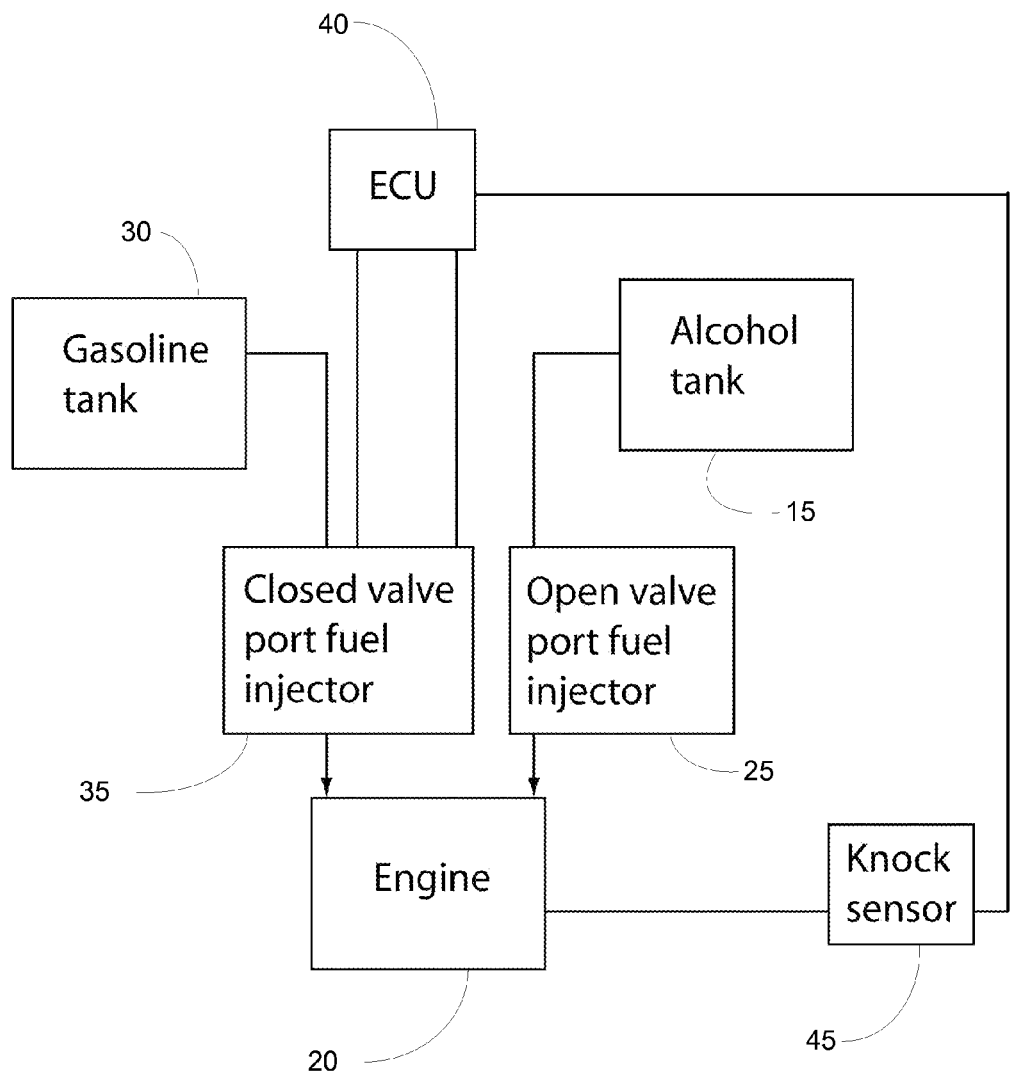
FIG. 1 is a schematic diagram of an engine having two tanks with two port fuel injectors according to one embodiment.

FIG. 1 shows a schematic diagram of a gasoline engine where alcohol or some other fluid from a secondary tank 15 is introduced into the engine cylinder 20 by an open-valve port fuel injector 25 and the gasoline from the primary tank 30 is introduced by a closed-valve port fuel injector 35. While gasoline and alcohol are shown in FIG. 1 as being stored in primary tank 30 and secondary tank 15, respectively, the invention is not limited to this embodiment. Any primary fuel may be used in the primary tank 30, including gasoline and gasoline-alcohol mixtures. Similarly, any fuel which contains alcohol as a constituent can be used in the secondary tank 15. This includes a fuel which contains only alcohol or an alcohol-water mixture. In this embodiment, one fuel injector (the "open-valve port fuel injector") 25 injects fuel when the intake valve is open or more open than the other fuel injector (the "closed-valve port fuel injector") 35. For a given amount of fuel that is introduced into the engine by the fuel injector the open-valve port fuel injector provides more vaporization cooling than the closed valve port fuel injector. Additionally, the two injectors may have different characteristics and/or be positioned differently.

The ratio of fuel from the secondary tank 15 to fuel from the first tank 30 is controlled by the ECU 40, which also determines the timing of the injection. This ratio increases with increasing torque so as to prevent knock. In the preferred embodiment, in addition to timing relative to valve opening, the open-valve port fuel injector 25 is located so as to maximize vaporization cooling.

Maximization of vaporization cooling may be achieved through various means, including, but not limited to, spatial positioning of the open-valve injector 25 that is different from that of the closed-valve injector 35, such as being closer to the intake valve, so as to maximize the amount of liquid fuel that enters the engine cylinder 20; operation of the open-valve injector 25 with a different spray pattern than the closed-valve injector 35; and operation of the open-valve injector 25 with a higher pressure or with an air assist injector so as to optimize droplet size distribution. Droplet size optimization means decreasing the size of the droplets in order to allow the droplets to closely follow the air flows, for increased transmission of the droplets into the cylinder and decreased wall wetting, once inside the cylinder. Droplet size distribution is not important for conventional (closed-valve) port fuel injectors. For the "open-valve fuel injectors" 25, spray pattern as well as droplet size distribution is important.

The "open-valve port fuel injector" 25 shown in Figure may be located at a different position within the cylinder 20 than the port fuel closed valve injector 35 and could provide a different spray characteristics (pattern and/or droplet size distribution).

Also, as shown in FIG. 1, the alcohol to gasoline ratio can be determined by closed loop control using a knock detector 45. In other embodiments, the ratio can be controlled by open loop control using a look up table. It is preferred that the engine 20 be operated with a substantially stoichiometric fuel-air ratio, which determines the total amount of fuel injected into the cylinder, while the ratio of the two fuels is determined, as least in part, by knock.

The alcohols that are provided by the second tank include ethanol, methanol, a mixture of ethanol and methanol, and alcohol mixtures with water. The alcohols could also include ethanol-gasoline mixtures including, but not limited to, E85 and methanol-gasoline mixtures including, but not limited to M85. For a given amount of fuel energy from the alcohol, methanol would provide significantly more knock resistance than ethanol.

In another embodiment, only one fuel tank may be needed. This embodiment uses two port fuel injectors, where one is an open valve port fuel injector that injects a different fuel from the other injector. These two different fuels are obtained by onboard separation from an alcohol-gasoline mixture that is stored in the tank on the vehicle.

In this embodiment, the alcohol-gasoline mixture from the tank is sent to an onboard fuel separator that produces two fuel streams. One of the fuel streams has a higher alcohol content than the stored gasoline-alcohol mixture, while the other fuel stream has a lower alcohol content than either the other fuel stream from the onboard fuel separator or the stored gasoline-alcohol fuel mixture. The higher alcohol content fuel stream from the onboard fuel separator is sent to the open valve port fuel injector. The fuel separation can be obtained by using a membrane as described in U.S. Pat. No. 7,225,787 where an onboard fuel separator separates ethanol from a gasoline-ethanol mixture using a membrane.

For example, ethanol could be obtained from onboard separation from a low concentration ethanol-gasoline mixture such as E10, which is generally available at service stations in the United States. The higher ethanol concentration stream is sent to the open valve port fuel injector and the lower ethanol concentration stream is sent to the closed valve port fuel injector. The ratio of the higher ethanol concentration fuel stream to the lower ethanol concentration fuel stream increases with increasing torque. The ratio can be controlled so as to prevent knock using closed loop control with a knock detector or open loop control using a lookup table.

Onboard separation could also be used to separate methanol from M15 or another methanol-gasoline mixture stored on the vehicle. M15 use is rapidly growing in China. The high concentration methanol stream could be introduced into the engine by an open valve port fuel injector in the same way as described above for ethanol and controlled by closed or open loop control.

In another embodiment, the onboard separation described above can be used with a two tank system, such as that shown in FIG. 1, where the secondary tank stores an alcohol-based mixture, which is used for open valve fuel injection. In this case the alcohol-gasoline mixture in the primary tank is sent to the onboard fuel separator which then provides an alcohol based fuel to either the secondary tank or directly to the open valve port fuel injector. The open valve port fuel injector can then inject fuel that is provided by the onboard fuel separator, an external source that provides fuel to the secondary tank or a combination of fuel that is provided externally to the secondary tank and fuel that is provided by onboard separation of fuel from the primary tank.

Alcohol (either ethanol or methanol) from onboard separation of alcohol from an alcohol-gasoline mixture stored in a tank onboard the vehicle can be employed in flexible fuel vehicles, where the alcohol content in the alcohol-gasoline mixture varies from 100% alcohol to 0% alcohol. Therefore, the terms "alcohol-gasoline mixture", "ethanol-gasoline mixture" and "methanol-gasoline mixtures" all include mixtures in which no alcohol is present. The operation of the onboard separation system, including its use or non-use, can be adjusted as a function of the amount of alcohol in the alcohol-gasoline mixture.

When the stored fuel does not include alcohol, increased spark retard and/or reduced turbocharger pressure (if a turbocharger is used) can be used to prevent knock that would otherwise occur. Reduction of the effective compression ratio by variable valve timing can also be used to prevent knock that would otherwise occur. In these cases, the vehicle can be operated, albeit with reduced efficiency and/or performance.

The onboard separation embodiment and other embodiments disclosed here can be more generally used with the use of two injectors where one injector introduces a higher fraction of the fuel in the form of a liquid into the cylinder and this injector provides the fuel with higher alcohol content.

Open valve port fuel introduction of methanol, which is produced by onboard separation of a methanol-gasoline mixture, into a spark ignition engine, which is a modified diesel engine, provides the strength for high compression ratio, high turbo pressure operation, and could provide a gasoline engine with diesel-like efficiency and torque. Another engine that would be relatively straightforwardly modified for this application would be a spark ignition engine that is used for natural gas operation in heavy duty vehicles.

Alcohol that is open-valve port fuel injected from a second source can also be used to increase the knock resistance of engines that are primarily fueled with natural gas or another gaseous fuel such as propane or hydrogen-rich gas provided by reforming. The ratio of the amount of alcohol to the amount of natural gas would be increased with increasing torque and controlled so as to prevent knock using closed loop control with a knock detector and/or using open loop control.

Another embodiment of open-valve port fuel injection in a spark ignition engine fueled with natural gas is use in a vehicle that is externally supplied with natural gas which is placed in a first tank and with a gasoline-alcohol mixture which is placed in a second tank. Onboard separation is employed to separate the alcohol from the alcohol-gasoline mixture and produce a fuel that has a higher alcohol concentration than the alcohol-gasoline mixture in the second tank.

This embodiment can allow an engine that is designed to make use of the high knock resistance of natural gas to also be operated on an externally supplied gasoline-alcohol mixture that provides a separated fuel which provides the same or higher knock resistance as natural gas. Using onboard separation of alcohol from a low concentration alcohol-gasoline mixture, such as E10, the engine could provide the same or greater efficiency on an energy basis than it provides when operated with natural gas alone.

In this embodiment, natural gas or another gaseous fuel such as hydrogen or propane, would be introduced into the engine by a first means. Onboard separated gasoline with reduced alcohol content relative to the externally supplied gasoline mixture would be introduced by a second means which is a port fuel injector; and alcohol or onboard separated gasoline with a higher alcohol content would be introduced by a third means which is a open-valve port fuel injector. When there is no natural gas available to fuel the engine, it can be run on fuel provided by the second and third means of fuel introduction, where the ratio of the fuel introduced from the third fuel introduction means to fuel provided by the second fuel introduction means increases with increasing torque. Direct injection could be used as an alternative to open-valve port fuel injection for the third fuel introduction means.

Knock suppression can be increased by using controlled valve lift to assist in conditioning the liquid aerosols. Small inlet valve opening during the time of injection, with high air speeds, aids the formation of small aerosols, through the breakup of larger aerosols. The injectors can be positioned such that, when operating, they are providing fuel flow in the general direction of the opening generated by the valve opening. Late injection, i.e. when the cylinder is closer to bottom dead center (BDC), also offers advantages. The amount of alcohol that is injected is greatest at high torque, operation at wide open throttle (WOT) or operation at high pressure (with turbocharging or supercharging). Therefore, use of conditions near the valve which create small droplets (i.e., high air speed near the valves) must be balanced with the need of accepting the largest amount of air possible, which requires large opening of the valves. At higher speeds, when injection time crank-angle degrees become a substantial fraction of the inlet valve open time, it is necessary to start injecting the alcohol earlier. However, the calculations discussed in U.S. Pat. No. 7,225,787 show that the alcohol requirement decreases at the higher speed, as the tendency of the engine to knock decreases with engine speed.

There are advantages of combining the approach with VVT (variable valve timing), and with variable valve lift, to minimize the alcohol required by optimizing the injection. Optimization of the injection refers to avoiding wall-wetting, increasing the evaporative cooling effect of the injected liquid fuels, achieving appropriate droplet size distribution.

By adjusting the closing of the inlet valves, it is also possible to dynamically adjust the effective compression ratio. Decreasing the effective compression ratio is a practical way of maintaining the performance of the engine when the alcohol-based fuel has been depleted or when the concentration of alcohol in the secondary fuel (and thus the evaporative cooling effect) is lower. In this manner, although the efficiency of the engine is lowered, the performance of the engine can be maintained. Decreasing the effective compression ratio can also be used in embodiments where there is only one fuel tank containing an alcohol-gasoline mixture and the alcohol content in the mixture is decreased.

However, for some low-end applications, avoiding VVT and variable lift may be preferable, thereby avoiding costly components, but requiring higher alcohol fractions.

An illustrative ratio of the amount of methanol-based fuel to the amount of gasoline in a dual fuel engine with on-demand alcohol injection is 0.3. For stoichiometric conditions, the air/methanol ratio is about 6.5, and the air/gasoline ratio is about 14. Therefore, in this case, the air/methanol fuel ratio is about 50:1. Assuming that the maximum mass of the atomized liquid to the air is about 20%, then the fuel needs to be injected during at least 10% of the air induction. A faster rate of fuel delivery of the alcohol fuel can be used, such as delivering the fuel during the time when the air inducted into the cylinder has the highest speed. The fastest air induction occurs approximately when the cylinder is halfway between Top Dead Center (TDC) and BDC, especially during conditions of high load. The rate of fuel delivery is substantially higher than that of conventional port fuel injection (PFI), where fuel is sprayed onto the valve over a substantial fraction of the engine revolution.

The use of fast delivery can be used to generate a fine spray with droplets smaller than conventional PFI. In some embodiments, the droplets may be about 120-150 micron in diameter. Injectors operating at slightly higher pressures than conventional PFI systems can be used to assist in generating a fine spray. In addition, the open-valve port fuel injector can be located close to the valve, in order that the high velocity of the air inducted into the engine aids in the droplet breakup. The open valve port fuel injector can be located closer to valve than the closed valve port fuel injector. It can also be located and aimed so that the fuel is sent in the general direction of the intake valve opening.

In the case of multiple inlet valves, it is possible to direct the alcohol-based injector toward any one of the valves or toward all valves. The use of a single valve could provide a degree of stratification of the air/fuel mixture. It is possible to have different valve-lift in each valve or a multiple valve system, to best accommodate the injection of the alcohol-based fuel.

The fuel from the open-valve port fuel injector can be injected in the cylinder without the formation of the usual film that is present in conventional port fuel injection. If the alcohol based fuel is sprayed directly onto a dry section (that is, a region of the inlet valve devoid of film associated the first fuel) of the inlet valve where the air inducted into the engine flows, it has been shown that the liquid droplets from the injector (120-150 microns) impinge on the surface but are bounced back into the air flow as smaller droplets (~40 micron droplets). [C. Brehm and J. H. Whitelaw, L. Sassi, C. Vafidis, *Air and Fuel Characteristics in the Intake Port of a SI Engine*, SAE paper 1999-01-1491]. The process can allow for finer sprays, with the smaller aerosols being able to follow the air through the opening around the inlet valve, and avoid/minimize wall wetting once in the cylinder, and allow for faster vaporization.

The use of two injectors allows increased operational flexibility of the engine. The additional flexibility is useful during transients, as a non-limiting example. For example, the delaying effect due to build-up of films in the inlet valves in gasoline engines can be eliminated by the injection of the alcohol based fuel, which allows for fast (cycle-to-cycle) variation in the amount of fuel injected into the cylinder.

An alternative to using two separate port fuel injectors is to use a single port fuel injector where the fuel from the secondary tank and fuel from the primary tank are mixed in varying ratios as the torque is increased as described in U.S. Pat. No. 7,314,033. The timing of the fuel injection can be varied so that it increases with increasing torque so as to prevent knock. A disadvantage of this approach is that it may be difficult to spatially and operationally optimize one fuel injector for both good mixing and vaporization cooling. In addition, there is a need for means to rapidly vary the ratio of the two fuels as the torque changes. This requirement can be met by using a single injector with two valves. The injector can have either one nozzle or set of nozzles per valve, or two nozzles or sets of nozzles, one for each valve. Each valve would separately inject either the gasoline or the alcohol.

Figure 2:
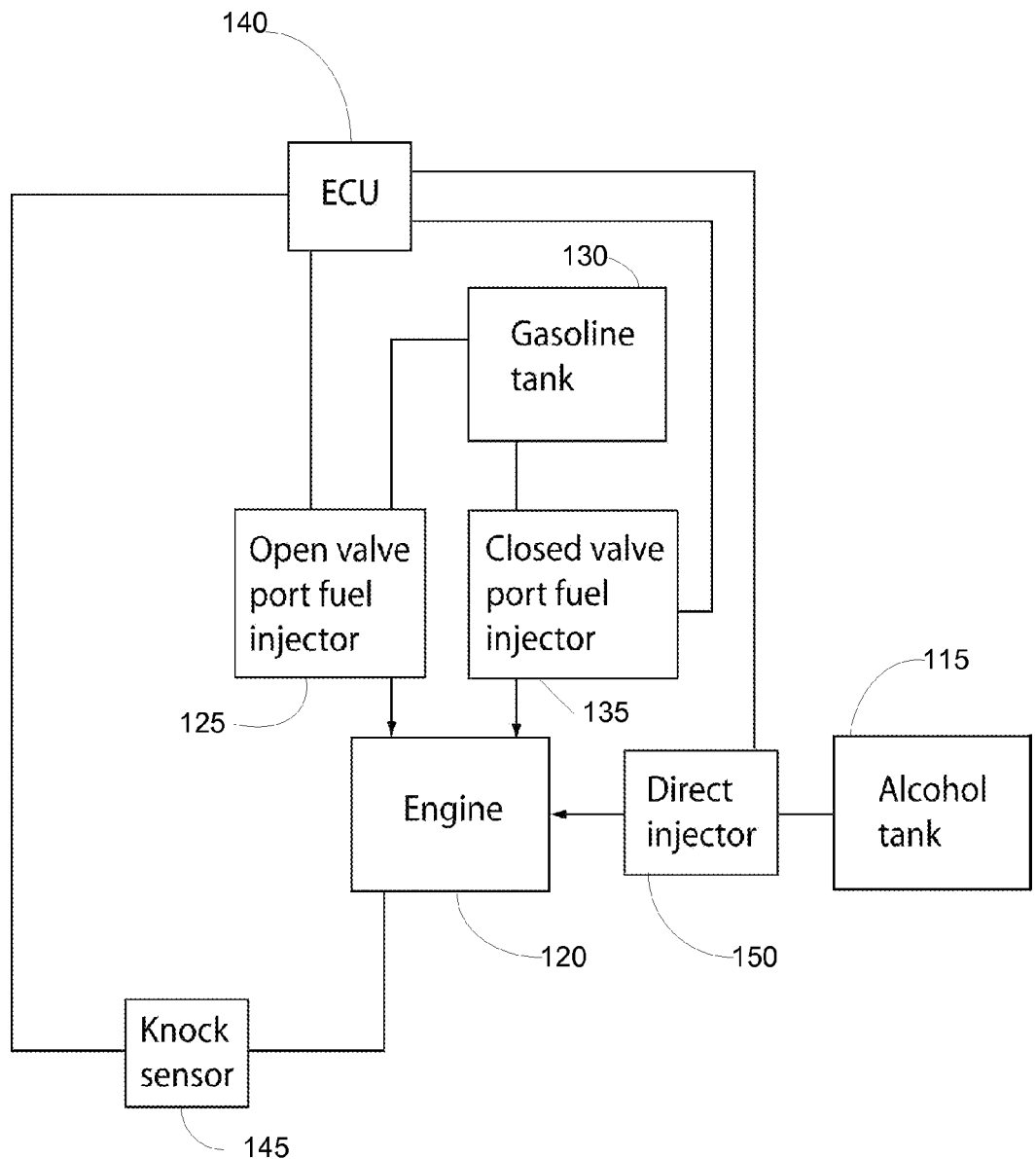
FIG. 2 is a schematic diagram of an engine having two tanks and two port fuel injectors according to another embodiment which includes a direct fuel injector.

The use of an open-valve port fuel injector in conjunction with closed valve port fuel injector can also be used together with direct injection to reduce alcohol-based fuel consumption in a dual fuel gasoline engine 120 with on-demand direct injection of alcohol. This embodiment is shown in FIG. 2. In this embodiment, the two port fuel injectors 125, 135 would be employed to obtain increased maximum torque using only fuel from the primary tank 130. As described above, the primary tank, though labeled gasoline tank 130, may contain any primary fuel, including gasoline or gasoline-alcohol mixtures. The fuel from the secondary tank 115 would be directly injected through direct injector 150. Again, the secondary tank 115 may contain any fuel that has alcohol as a constituent. This approach would minimize the amount of alcohol-based-fuel from the secondary tank 115 that is used over a drive cycle. The timing of the open valve and closed valve port injectors 125, 135 may be controlled by ECU 140 using knock sensor 145, as described above.

A variation of this embodiment would be to use a single port fuel injector for the fuel that is provided by the primary tank, such as gasoline or gasoline with a low concentration of alcohol, and vary the injection timing so as to transition from closed valve injection to open valve injection as the torque is increased. During the increased torque, faster response of the system to fueling requirements can be achieved by the changing first the open valve injection rate, which can in principle be adjusted from cycle to cycle, and then adjust the ratio on a longer time scale. The same can be done when the engine is decreasing torque.

Figure 3:
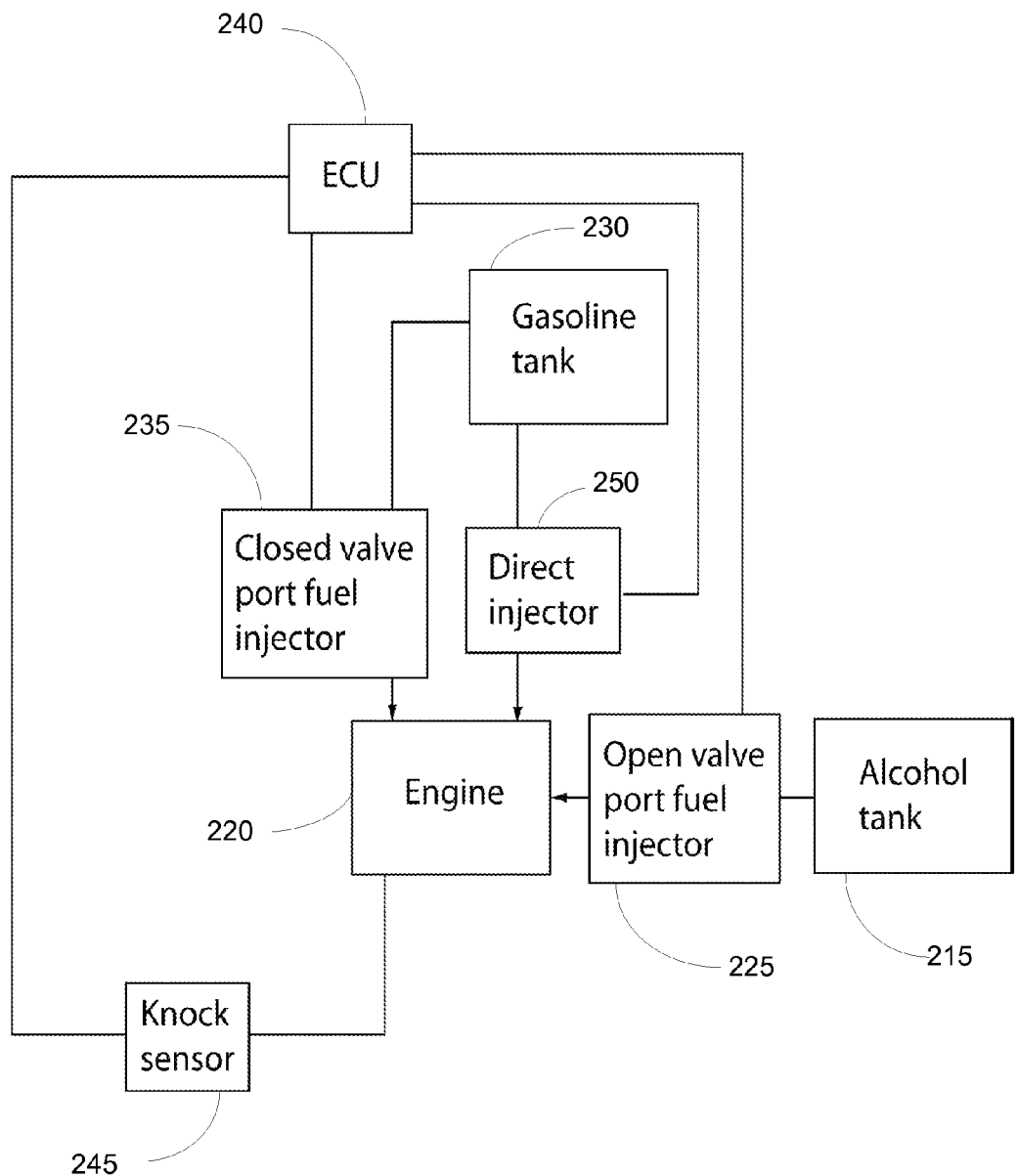
FIG. 3 is a schematic diagram of an engine having two tanks and two port fuel injectors according to another embodiment which includes a direct fuel injector.

Another use of two port fuel injectors and one direct fuel injector is to use a closed-valve port fuel injector 235 and a direct injector 250 for providing fuel from the primary fuel tank 230 and an open-valve port fuel injector 225 for providing fuel from the secondary tank 215, as shown in FIG. 3. The use of port fuel injection of the fuel from the secondary tank 215 could be the easiest alcohol boosted technology to implement on existing gasoline direct injection engines and open-valve port fuel injection provides the highest knock resistance. The use of a closed-valve port fuel injector 235 for introduction of the primary fuel at low loads provides improved mixing and combustion stability at low loads. The timing of the open valve and closed valve port injectors 225, 235 may be controlled by ECU 240 using knock sensor 245, as described above. As described above, the primary tank, though labeled gasoline tank 230, may contain any primary fuel, including gasoline or gasoline-alcohol mixtures. Again, the secondary tank 215 may contain any fuel that has alcohol as a constituent.

Figure 4:
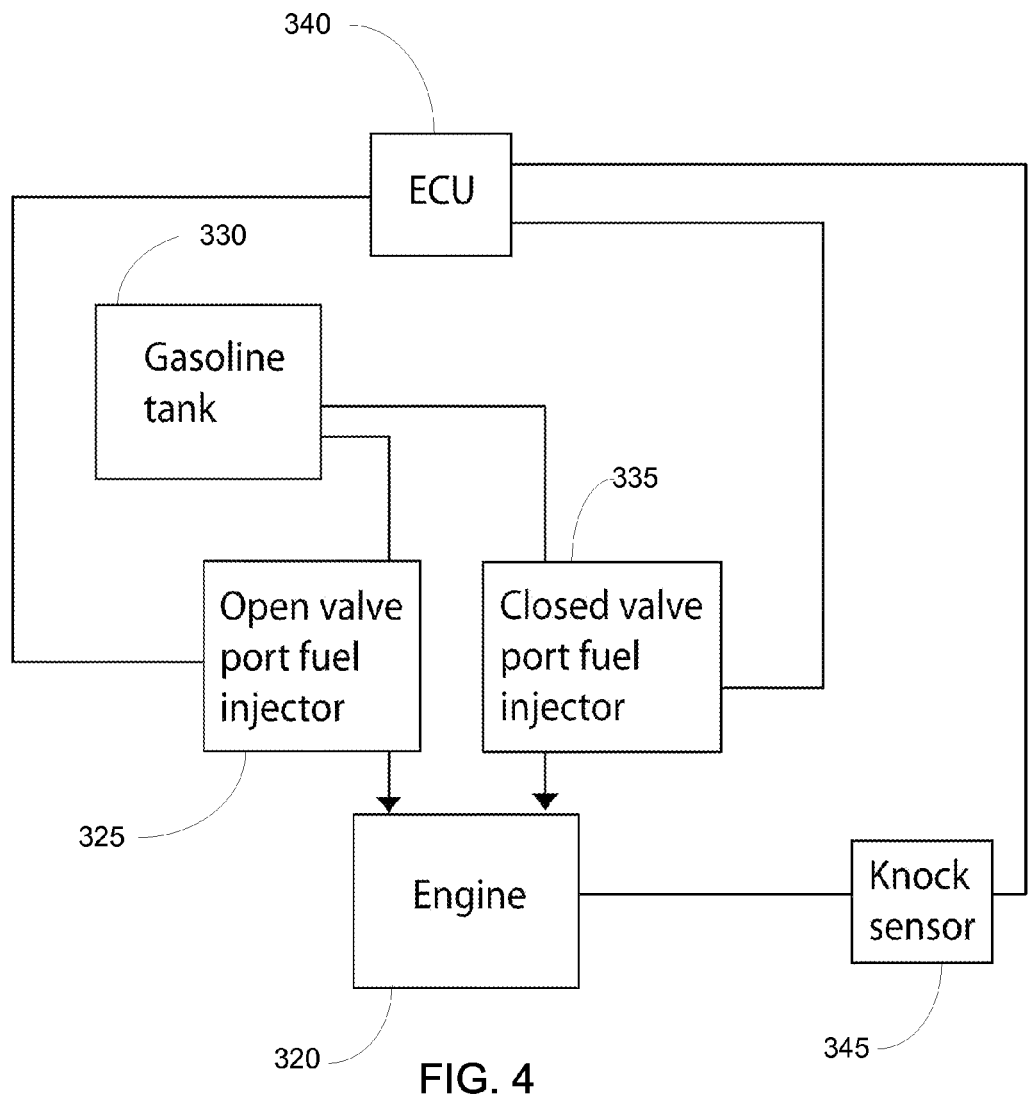
FIG. 4 is a schematic diagram of an engine having a single fuel tank with two port fuel injectors according to one embodiment.

The use of both a closed-valve port fuel injector and an open-valve port fuel injector can also be employed where there is no secondary tank or onboard separation and both injectors provide the same fuel to the engine cylinders. This is shown in FIG. 4. In this embodiment, one fuel injector (the "open-valve port fuel injector") 325 injects fuel when the intake valve is open or more open than is the case for the other fuel injector (the "closed-valve port fuel injector") 335. Additionally, the two injectors 325, 335 may have different characteristics and/or be positioned differently. The closed-valve port fuel injector 335 provides the advantage of better combustion stability and better fuel air mixing while the open valve port fuel injector 325 provides the higher knock resistance, which allows higher compression ratio operation and/or higher levels of turbocharging than would be possible with closed-valve port fuel injection. As described above, the primary tank, though labeled gasoline tank 330, may contain any primary fuel, including gasoline or gasoline-alcohol mixtures.

By using closed-valve port fuel injection at low loads and open-valve port fuel injection at high loads with the same fuel introduced by both injectors, greater combustion stability and thus operation at higher EGR can be obtained while, at the same time, knock resistance is stronger at higher loads where knock would otherwise occur. The ratio of the amount of fuel provided by the open-valve port fuel injection to fuel provided by closed-valve port fuel injection may increase with torque. This ratio could be controlled with an ECU 340 using closed loop control with a knock detector 345 or by open-loop control using a look up table. For a given level of knock-free torque, the control system 340 minimizes the amount of fuel that is introduced into the engine 320 with open-valve port fuel injection and thus maximizes mixing and combustion stability and minimizing particulate emissions. In FIG. 4, the open-valve port fuel injector 325 can be positioned differently than the closed-valve port fuel injector 335 in order to maximize knock resistance.

This embodiment could be particularly important for fuels that contain alcohol as a constituent, such as gasoline-ethanol or gasoline-methanol mixtures, ethanol or methanol where a substantial increase in knock resistance can be obtained by using open-valve port fuel injection instead of closed-valve port fuel injection.

An alternative for the use of two separate port fuel injectors for injecting fuel from a single tank is to use one port fuel injector where the timing of the port fuel injection is such that the amount of fuel that is introduced when the intake valve is open increases with increasing torque.

Heavy EGR can be employed to increase the efficiency gain provided by any of the above open-valve port fuel injector embodiments. It is preferred to use EGR levels of at least 30% and in more preferably at least 40%. It is also preferred to operate with a compression ratio of at least 14 and more preferably at least 15.

The use of heavy EGR to increase alcohol fueled spark ignition engine efficiency has been shown by M. J. Brusstar and C. L. Gray, Jr, (*High Efficiency with Future Alcohol Fuels in a Stoichiometric Medium Duty Spark Ignition Engine*, SAE paper 2007-01-3993). They used cooled EGR in a turbocharged engine that was port injected with M85 or E85, and operated at a very high compression ratio (16). The engine used one port fuel injector per cylinder.

In contrast to Brusstar and Gray, the preferred use of heavy EGR in the open valve port fuel injector embodiments described here is to use hot EGR (that is, EGR that is not cooled by a heat exchanger as is the case with cooled EGR). An additional difference is that, while EGR is used at low loads to increase efficiency, it is reduced or eliminated at high loads so as to remove the adverse effect of hot EGR on knock. This use of hot EGR removes the expense and complexity of cooling and has a less adverse effect on combustion stability than cooled EGR.

Heavy EGR allows the engine to operate nearer to wide-open throttle conditions at partial load, to decrease the engine friction losses, and would be decreased at higher loads. The amount of heavy hot EGR that would be used at low and intermediate loads would be greater than that which is employed in present production gasoline engine vehicles, The amount of EGR that can be employed is limited by combustion stability. Combustion stability is improved by use of high compression ratio. It is also improved by the amount of alcohol in an alcohol-gasoline mixture since alcohol has a higher flame speed. For flexible fuel engines with a wide range of alcohol-gasoline mixtures, it can be advantageous to vary the EGR level as the alcohol-gasoline ratio is varied. The EGR level can be decreased when the alcohol concentration in the fuel decreases. The EGR level can be controlled by closed loop control using a misfire detector or by open loop control using a look up table.

Combustion stability is also better with closed valve port fuel injection rather than open valve port fuel injection. Consequently, the use of closed valve port fuel injection at low load and open valve port fuel injection at high load can maximize the amount of EGR at low loads and also the amount of knock suppression at high loads.

An additional means to increase the efficiency is to use engine cylinders of sufficiently large volume so as maximize the efficiency impact of high compression ratio operation by minimizing the surface to volume ratio and resulting heat losses. The preferred engine cylinder size is at least 0.5 liters and more preferably greater than 0.6 liters. The engine size can be kept small by decreasing the number of cylinders.

Because the engine is operated at a high compression ratio, it is important not to run out of alcohol when the alcohol is provided by a second tank. Otherwise, the engine performance might have to be substantially degraded in order to prevent knock. As discussed in U.S. Pat. Nos. 7,225,787 and 7,314,033, the alcohol consumption could be reduced in a gradual way by increasing spark retard as a function of the remaining fluid in the alcohol tank. In addition, various warning lights could activate at various times to alert the driver of a low supply.

Very high compression ratio operation and use of heavy hot EGR at low loads could also be used in engines that employ direct injection instead of open valve port fuel injection. In this case, in addition to very high compression ratio operation, the engines could operate at very high turbocharger boost pressures without knock.

Another embodiment of this invention is the use of a constant level of hot EGR throughout the torque range so as minimize the cost of EGR control.

In order to minimize poor performance with charge cooling, it is advantageous to use a combustion process that is fast. The addition of EGR, coupled to or independent of the large evaporative cooling, has a detrimental impact on the combustion initiation (defined as time to combust 10% of the fuel) as well as combustion duration (defined as time to combust of 10% to 90% of the fuel). Combustion initiation has an impact on misfire (cycle-to-cycle variation of combustion), while combustion duration has an impact on the efficiency. In order to minimize the use of the alcohol from the second tank, the use of a fast combustion engines (short combustion duration) is good. The use of a high performance ignition system, and a chamber optimized for fast combustion (both through in-cylinder charge motion/turbulence as well as appropriate location of the spark) and design of the cylinder and piston (having a condition that is closer to a sphere rather than a disk, with the spark near the center), decreases the tendency of knock by combusting the fuel before it has time to autoignite. The use of a high performance ignition system can be used to extend the misfire-free engine operating region, which could occur at high loads when there is large amount of EGR or large amounts of water in the anti-knock additive.

Heavy EGR use at low loads can be used in all of the open valve port fuel injection embodiments described previously. High compression ratio operation can also be used. Use of heavy EGR in the all of embodiments described previously could also be used in an engine where direct injection is used instead of open valve port fuel injection.

The increased combustion stability provided by the combination of closed valve port fuel injection, high compression ratio and the use of alcohol as a fuel constituent can also be employed with the open-valve embodiments described previously to enable a higher air/fuel ratio and extend the lean limit of engine operation.

What is claimed is:

1. A spark ignition engine where fuel is directly injected as a liquid and EGR is used; and
where fuel is also port fuel injected; and
where the ratio of directly injected fuel to port injected fuel increases with increasing torque; and
where the port injected fuel is employed in such a way that the amount of EGR that can be used without encountering a combustion stability limit is increased relative to the amount of EGR that could be used if port fuel injection were not employed.

2. The spark ignition engine of claim 1 where EGR is used at low loads and the amount of EGR that can be used at low loads without encountering a combustion stability limit is increased.

3. The spark ignition engine of claim 1 where the EGR level is at least 30%.

4. The spark ignition engine of claim 1 where the port fuel injection is employed in such a way that particulate emissions are lower than would be the case if port fuel injection were not used.

5. The spark ignition engine of claim 1 where the engine is turbocharged and where the port fuel injection is employed in such a way that particulate emissions are lower than would be the case if port fuel injection were not used.

6. The spark ignition engine of claim 1 where a fast combustion engine is used.

7. The spark ignition engine of claim 1 where the fuel includes alcohol.

8. The spark ignition engine of claim 1 where a misfire detector is used to control the amount of EGR.

9. The spark ignition engine of claim 1 where hot EGR, which is EGR that is not cooled by a heat exchanger, is used at low loads.

10. The spark ignition engine of claim 1 where hot EGR, which is EGR that is not cooled by a heat exchanger, is used at low load and the amount of EGR is reduced or eliminated at high load.

11. The spark ignition engine of claim 1 where hot EGR, which is EGR that is not cooled by a heat exchanger, is used at low load and the amount of EGR is reduced or eliminated at high load so as to avoid the adverse effect of knock.

12. The spark ignition engine of claim 1 where gasoline is introduced into the engine by direct injection and port injection.

13. The spark ignition engine of claim 1 where, as torque is increased, the ratio of directly injected fuel to port injected fuel is increased so as to prevent knock.

14. The spark ignition engine of claim 1 where the port fuel injection is employed in such a way so as to increase efficiency relative to what it would be if the engine was only fueled by a direct injection fueling system.

15. A spark ignition engine where fuel is directly injected as a liquid and EGR is used; and
   where fuel is also port fuel injected; and
   where the ratio of directly injected fuel to port injected fuel increases with increasing torque; and
   where port injected fuel is employed in such a way that the amount of EGR that can be used without encountering a combustion stability limit is increased relative to the amount of EGR that could be used if port fuel injection were not employed; and
   where the EGR is cooled.

16. The spark ignition engine of claim 15 where EGR is used at low loads and the amount of EGR that can be used at low loads without encountering a combustion stability limit is increased.

17. The spark ignition engine of claim 15 where the EGR level is at least 30%.

18. The spark ignition engine of claim 15 where the port fuel injection is employed in such a way that particulate emissions are lower than would be the case if port fuel injection were not used.

19. The spark ignition engine of claim 15 where the engine is turbocharged and where the port fuel injection is employed in such a way that particulate emissions are lower than would be the case if port fuel injection were not used.

20. The spark ignition engine of claim 15 where a fast combustion engine is used.

21. The spark ignition engine of claim 15 where the compression ratio is at least 14.

22. The spark ignition engine of claim 15 where the amount of EGR is controlled by closed loop control using a misfire detector.

23. The spark ignition engine of claim 15 where a fast combustion engine is used.

24. The spark ignition engine of claim 15 where the fuel includes alcohol.

25. The spark ignition engine of claim 15 where the amount of EGR is controlled by open loop control so as to prevent misfire.

26. The spark ignition engine of claim 15 where the engine is fueled with directly injected and port injected gasoline.

* * * * *